US011888895B2

(12) United States Patent
Abzug et al.

(10) Patent No.: US 11,888,895 B2
(45) Date of Patent: Jan. 30, 2024

(54) USING NEURAL NETWORKS TO PROCESS FORENSICS AND GENERATE THREAT INTELLIGENCE INFORMATION

(71) Applicant: Proofpoint, Inc., Sunnyvale, CA (US)

(72) Inventors: Zachary Mitchell Abzug, Durham, NC (US); Kevin Patrick Blissett, Draper, UT (US); Brian Sanford Jones, Cary, NC (US)

(73) Assignee: Proofpoint, Inc., Sunnyvale, CA (US)

( * ) Notice: Subject to any disclaimer, the term of this patent is extended or adjusted under 35 U.S.C. 154(b) by 417 days.

(21) Appl. No.: 17/358,234

(22) Filed: Jun. 25, 2021

(65) Prior Publication Data

US 2022/0070212 A1  Mar. 3, 2022

Related U.S. Application Data

(60) Provisional application No. 63/073,640, filed on Sep. 2, 2020.

(51) Int. Cl.
*G06F 7/04* (2006.01)
*H04L 9/40* (2022.01)
(Continued)

(52) U.S. Cl.
CPC ......... *H04L 63/1483* (2013.01); *G06N 3/045* (2023.01); *G06N 3/08* (2013.01)

(58) Field of Classification Search
CPC ............. H04L 63/1483; H04L 63/1433; H04L 63/1425; H04L 63/1408; G06N 3/045; G06F 21/55; G06F 21/552; G06F 21/577
See application file for complete search history.

(56) References Cited

U.S. PATENT DOCUMENTS 11,153,242 B2 * 10/2021 Mei ...................... H04L 51/212
11,399,035 B1 *  7/2022 Batchu ............... H04L 63/1483
(Continued)

OTHER PUBLICATIONS

Mayhew et al., Use of Machine Learning in Big Data Analytics for Insider Threat Detection, Oct. 28, 2015, IEEE, pp. 915-922. (Year: 2015).*

(Continued)

*Primary Examiner* — Philip J Chea
*Assistant Examiner* — Jenise E Jackson
(74) *Attorney, Agent, or Firm* — Banner & Witcoff, Ltd.

(57) ABSTRACT

Aspects of the disclosure relate to generating threat intelligence information. A computing platform may receive forensics information corresponding to message attachments. For each message attachment, the computing platform may generate a feature representation. The computing platform may input the feature representations into a neural network, which may result in a numeric representation for each message attachments. The computing platform may apply a clustering algorithm to cluster each message attachments based on the numeric representations, which may result in clustering information. The computing platform may extract, from the clustering information, one or more indicators of compromise indicating that one or more attachments corresponds to a threat campaign. The computing platform may send, to an enterprise user device, user interface information comprising the one or more indicators of compromise, which may cause the enterprise user device to display a user interface identifying the one or more indicators of compromise.

15 Claims, 7 Drawing Sheets

(51) Int. Cl.
 *G06N 3/08* (2023.01)
 *G06N 3/045* (2023.01)

(56) References Cited

U.S. PATENT DOCUMENTS

| | | | |
|---|---|---|---|
| 2006/0184632 A1 | 8/2006 | Marino et al. | |
| 2014/0215617 A1* | 7/2014 | Smith | H04L 63/1441 |
| | | | 726/23 |
| 2015/0007312 A1 | 1/2015 | Pidathala et al. | |
| 2019/0173892 A1* | 6/2019 | Kemp | H04L 63/1408 |
| 2019/0349400 A1* | 11/2019 | Bruss | G06F 21/568 |
| 2020/0125943 A1* | 4/2020 | Copty | G06N 3/043 |
| 2020/0314125 A1* | 10/2020 | Hall | H04L 63/1425 |
| 2021/0021612 A1* | 1/2021 | Higbee | H04L 63/1491 |
| 2021/0200877 A1* | 7/2021 | Salo | G06F 16/338 |
| 2021/0306350 A1* | 9/2021 | Somol | H04L 63/14 |
| 2021/0358564 A1* | 11/2021 | Feinberg | G06N 3/084 |

OTHER PUBLICATIONS

Liu et al., Detecting and Preventing Cyber Insider Threats: A Survey, Feb. 1, 2018, IEEE, pp. 1397-1417. (Year: 2018).*
Nov. 23, 2021—(WO) ISR & Written Opinion—App PCT/US2021/048826.

* cited by examiner

USING NEURAL NETWORKS TO PROCESS FORENSICS AND GENERATE THREAT INTELLIGENCE INFORMATION

CROSS-REFERENCE TO RELATED APPLICATIONS

This application claims the benefit of and priority to U.S. Provisional Patent Application Ser. No. 63/073,640, filed Sep. 2, 2020, and entitled "Using Neural Networks to Process Forensics and Generate Threat Intelligence Information," which is incorporated by reference herein in its entirety.

TECHNICAL FIELD

Aspects of the disclosure relate to data processing methods, machine learning systems, and communication systems and networks. In particular, one or more aspects of the disclosure relate to using neural networks to process forensics and generate threat intelligence information.

BACKGROUND

Increasingly, individuals and organizations face various cybersecurity threats, and various efforts may be taken to identify cybersecurity threat campaigns (e.g., sets of threats that have been observed or are otherwise related in some way, such as threats sent out by the same malicious actor). The landscape of such threat campaigns is constantly changing, however. As a result of the changes in the threat landscape, it may be difficult to analyze large numbers of threats, group them into campaigns, and provide useful insights for protecting against such threats. This may result in undetected threat campaigns, thus leaving individuals and/or organizations vulnerable to cyber-attacks and/or other events in which there might be unauthorized access of proprietary or otherwise personal information.

SUMMARY

Aspects of the disclosure provide technical solutions that overcome one or more of the technical problems described above and/or other technical challenges. For instance, one or more aspects of the disclosure relate to using neural networks to process forensics and generate threat intelligence information.

In accordance with one or more embodiments, a computing platform having at least one processor, a communication interface, and memory may receive forensics information corresponding to a plurality of message attachments. The computing platform may generate, for each of the plurality of message attachments, a feature representation. The computing platform may input the feature representations into a neural network, which may result in a numeric representation for each of the plurality of message attachments. The computing platform may apply a clustering algorithm to cluster each of the plurality of message attachments based on the numeric representations, which may result in clustering information. The computing platform may extract, from the clustering information, one or more indicators of compromise indicating that one or more of the plurality of attachments corresponds to a threat campaign. The computing platform may send, to an enterprise user device, user interface information comprising the one or more indicators of compromise, which may cause the enterprise user device to display a user interface identifying the one or more indicators of compromise.

In one or more instances, the computing platform may train the neural network. In some instances, training the neural network may include training the neural network using metric learning and sub-word embeddings. In one or more instances, the computing platform may train the neural network using the metric learning by: 1) inputting two or more inputs into the neural network; 2) identifying labels corresponding to each of the two or more inputs; and 3) prompting the neural network to produce particular embeddings based on the identified labels.

In one or more instances, the neural network may be a Siamese network. In one or more instances, the neural network may be trained to produce a common embedding if the two or more inputs have corresponding labels, and to produce different embeddings if the two of more inputs have different labels.

In one or more instances, the computing platform may train the neural network to learn a vocabulary of sub-words adapted to threat identification. In one or more instances, the one or more indicators of compromise may each correspond to a particular threat campaign.

In one or more instances, the one or more indicators of compromise may indicate one or more of: a uniform resource locator (URL) known to host malicious content, a sender name, an internet protocol (IP) address, an organization name, or a country. In one or more instances, the computing platform may extract the one or more indicators of compromise by: 1) identifying one or more generic indicators of compromise; and 2) filtering, from the one or more indicators of compromise, the one of more generic indicators of compromise.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

As a brief introduction to the concepts described further below, one or more aspects of the disclosure relate to systems and methods for using neural networks to process forensics and generate threat intelligence information. By combining a data ingestion pipeline and a neural network, as described further herein, a software tool implementing one or more aspects of this concept may generate clusters of threats (which may, e.g., be used as a starting point for a threat investigation process). In some instances, this tool may be used to identify email attachment-based threats, uniform resource locator (URL)-based threats, and/or other threats. As an example, this tool may receive information identifying thousands of attachment-based threats per day and may reduce this dataset to hundreds of threat clusters (which may, e.g., be a much more manageable set of threats to further investigate).

Figure 1:
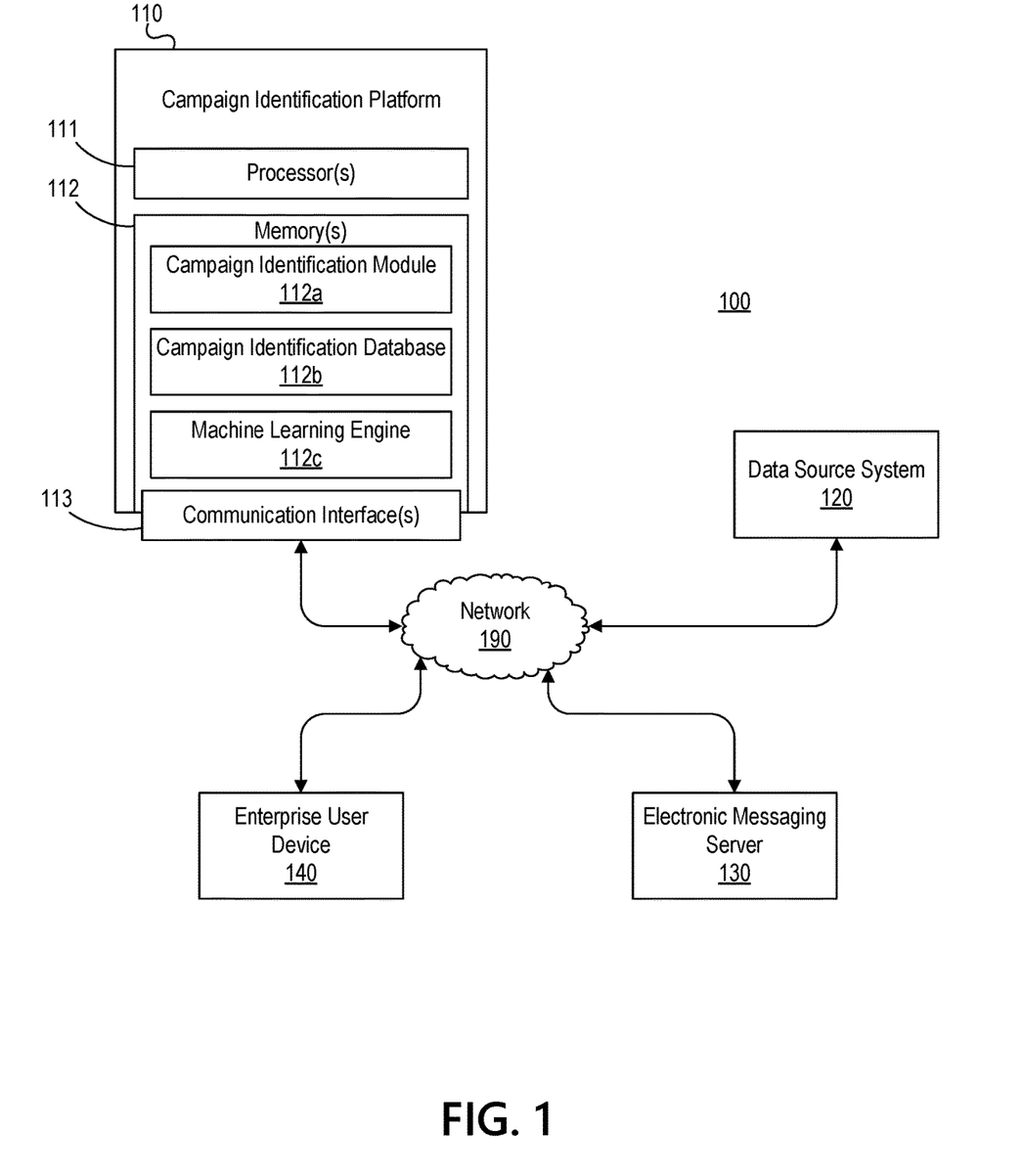
FIG. 1 depicts an illustrative operating environment for using neural networks to process forensics and generate intelligence information in accordance with one or more example embodiments.

FIG. 1 depicts an illustrative operating environment for using neural networks to process forensics and generate intelligence information in accordance with one or more example embodiments. Referring to FIG. 1, computing environment 100 may include various computer systems, computing devices, networks, and/or other operating infrastructure. For example, computing environment 100 may include a campaign identification platform 110, data source system 120, electronic messaging server 130, enterprise user device 140 and a network 190.

Network 190 may include one or more wired networks and/or one or more wireless networks that interconnect campaign identification platform 110, data source system 120, electronic messaging server 130, enterprise user device 140, and/or other computer systems and/or devices. In addition, each of campaign identification platform 110, data source system 120, electronic messaging server 130, and/or enterprise user device 140, may be special purpose computing devices configured to perform specific functions, as illustrated in greater detail below, and may include specific computing components such as processors, memories, communication interfaces, and/or the like.

Campaign identification platform 110 may include one or more processor(s) 111, one or more memory(s) 112, and one or more communication interface(s) 113. In some instances, campaign identification platform 110 may be made up of a plurality of different computing devices, which may be distributed within a single data center or a plurality of different data centers. In these instances, the one or more processor(s) 111, one or more memory(s) 112, and one or more communication interface(s) 113 included in campaign identification platform 110 may be part of and/or otherwise associated with the different computing devices that form campaign identification platform 110.

In one or more arrangements, processor(s) 111 may control operations of campaign identification platform 110. Memory(s) 112 may store instructions that, when executed by processor(s) 111, cause campaign identification platform 110 to perform one or more functions, as discussed below. Communication interface(s) 113 may include one or more wired and/or wireless network interfaces, and communication interface(s) 113 may connect campaign identification platform 110 to one or more networks (e.g., network 190) and/or enable campaign identification platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause campaign identification platform 110 to perform various functions) and/or databases (which may, e.g., store data used by campaign identification platform 110 in performing various functions). For example, memory(s) 112 may store and/or otherwise provide campaign identification module 112a, campaign identification database 112b, and a machine learning engine 112c. In some instances, campaign identification module 112a may store instructions that cause campaign identification platform 110 to train and apply neural networks to generate intelligence information, and/or execute one or more other functions described herein. Additionally, campaign identification database 112b may store data that is used by campaign identification platform 110 for generation of intelligence information and/or in executing one or more other functions described herein. Furthermore, machine learning engine 112c may store instructions and/or data that may cause and/or be used by campaign identification platform 110 to generate intelligence information and/or execute one or more other functions described herein.

Data source system 120 may be and/or include one or more computing devices that may be configured to store forensics data corresponding to files, attachments, URLs, and/or other data. For example, the data source system 120 may be configured to store one of more JavaScript Object Notation (JSON) documents that include one or more sets of forensics data for each attachment, file, URL, and/or other data. In one or more instances, the data source system 120 may be configured to communicate with the campaign identification platform 110 to share stored forensics data (which may, e.g., be used to train neural networks to generate intelligence information).

Electronic messaging server 130 may be and/or include one or more computing devices that may be configured to store and/or route electronic messages (e.g., emails, text messages, chat messages, and/or other message) between various user accounts and/or devices. In some instances, the electronic messaging server 130 may be configured to extract or otherwise identify metadata corresponding to the electronic messages. In these instances, the electronic messaging server 130 may be configured to communicate with the campaign identification platform 110 to share the identified metadata (e.g., which may be used to train neural networks to generate intelligence information).

Enterprise user device 140 may be configured to be used by a first user (who may e.g., be an employee of an enterprise organization). In some instances, enterprise user device 140 may be configured to present one or more user interfaces associated with identified intelligence information, receive forensics data and/or message metadata, and/or otherwise facilitate participation in generation and/or identification of threat intelligence information.

Figure 2A:
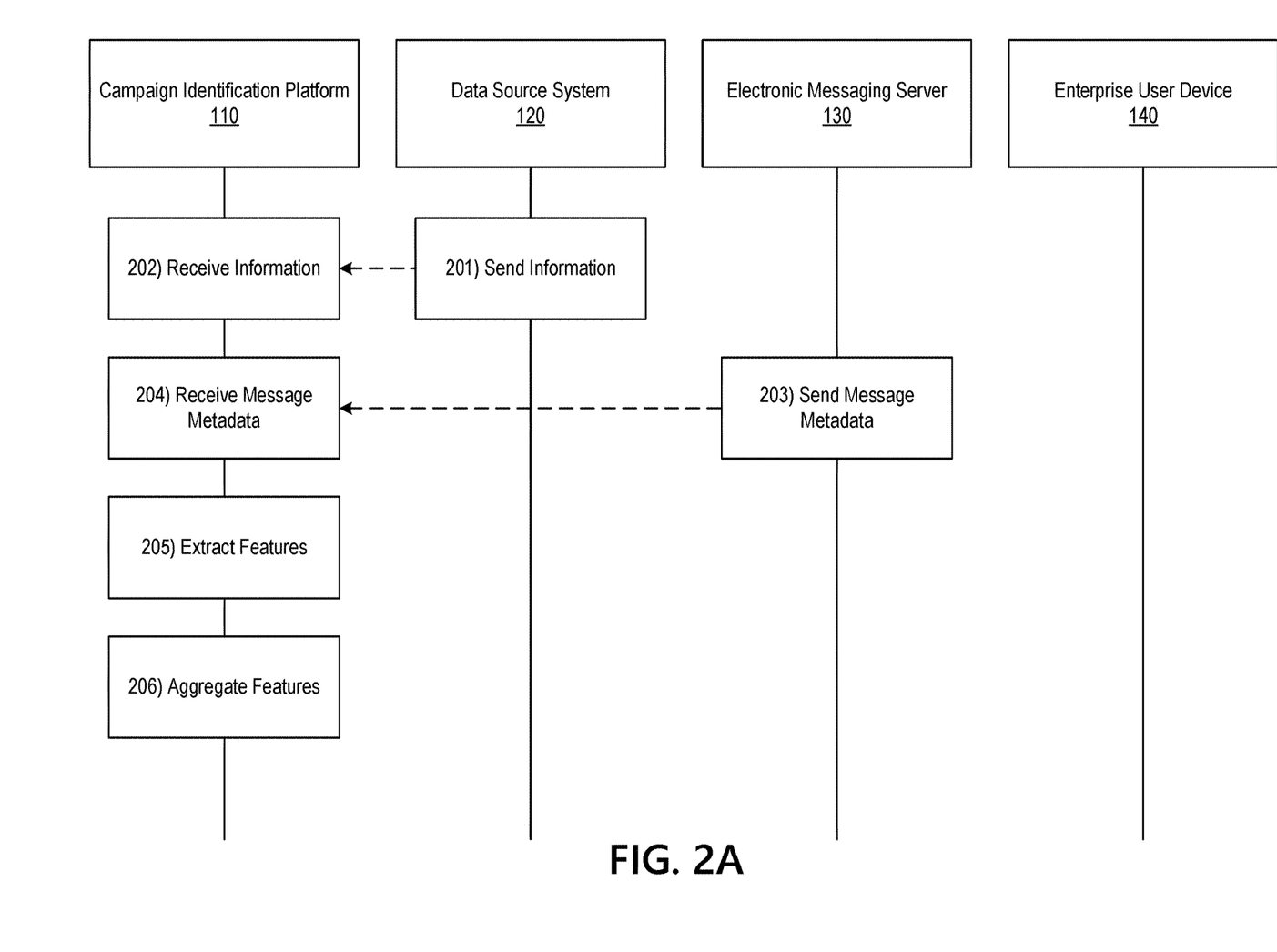
FIGS. 2A-2D depict an illustrative event sequence for using neural networks to process forensics and generate intelligence information in accordance with one or more example embodiments.

FIGS. 2A-2D depict an illustrative event sequence for using neural networks to process forensics and generate intelligence information in accordance with one or more example embodiments. Referring to FIG. 2A, at step 201, the data source system 120 may send information to the campaign identification platform 110. For example, the data source system 120 may identify forensics information that may be used to train one or more neural networks. For example, the data source system 120 may identify multiple sets of forensics data each produced for a particular cyber security threat (e.g., a single file, attachment, URL, and/or other object being evaluated). The data source system 120 may then send this identified forensics data to the campaign identification platform 110 (e.g., as a JSON document, or in another format).

At step 202, the campaign identification platform 110 may receive the information sent at step 201. For example, the campaign identification platform 110 may receive forensics data that may be used to train neural networks to output indicators of compromise.

At step 203, the electronic messaging server 130 may send message metadata to the campaign identification platform 110. For example, the electronic messaging server 130 may identify message metadata that may be used to train one or more neural networks. For example, the electronic messaging server 130 may send information such as message senders, subject lines, message domains, and/or other message metadata.

At step 204, the electronic messaging server 130 may receive the message metadata sent at step 203. For example, the electronic messaging server 130 may receive message metadata that may be used, in addition or as an alternative to the information received at step 202, to train one or more neural networks.

At step 205, the campaign identification platform 110 may extract one or more features from the information and/or the message metadata. For example, in extracting the one or more features from the information and/or the message metadata, the campaign identification platform 110 may identify one or more data labels and/or properties corresponding to the information and/or the message metadata (e.g., a URL, a sender, a subject line, a domain name, a geographic region, a time, and/or other features).

At step 206, the campaign identification platform 110 may aggregate the extracted one or more features for each attachment, URL, file, and/or other data object being analyzed. For example, the campaign identification platform 110 may aggregate features based on their corresponding threat campaigns. In some instances, the campaign identification platform 110 may receive information identifying these corresponding threat campaigns from an employee of an enterprise organization such as a threat researcher or other network security specialist (e.g., this received and/or original data may be manually labelled, and used to train the one or more neural networks as described below).

Figure 2B:
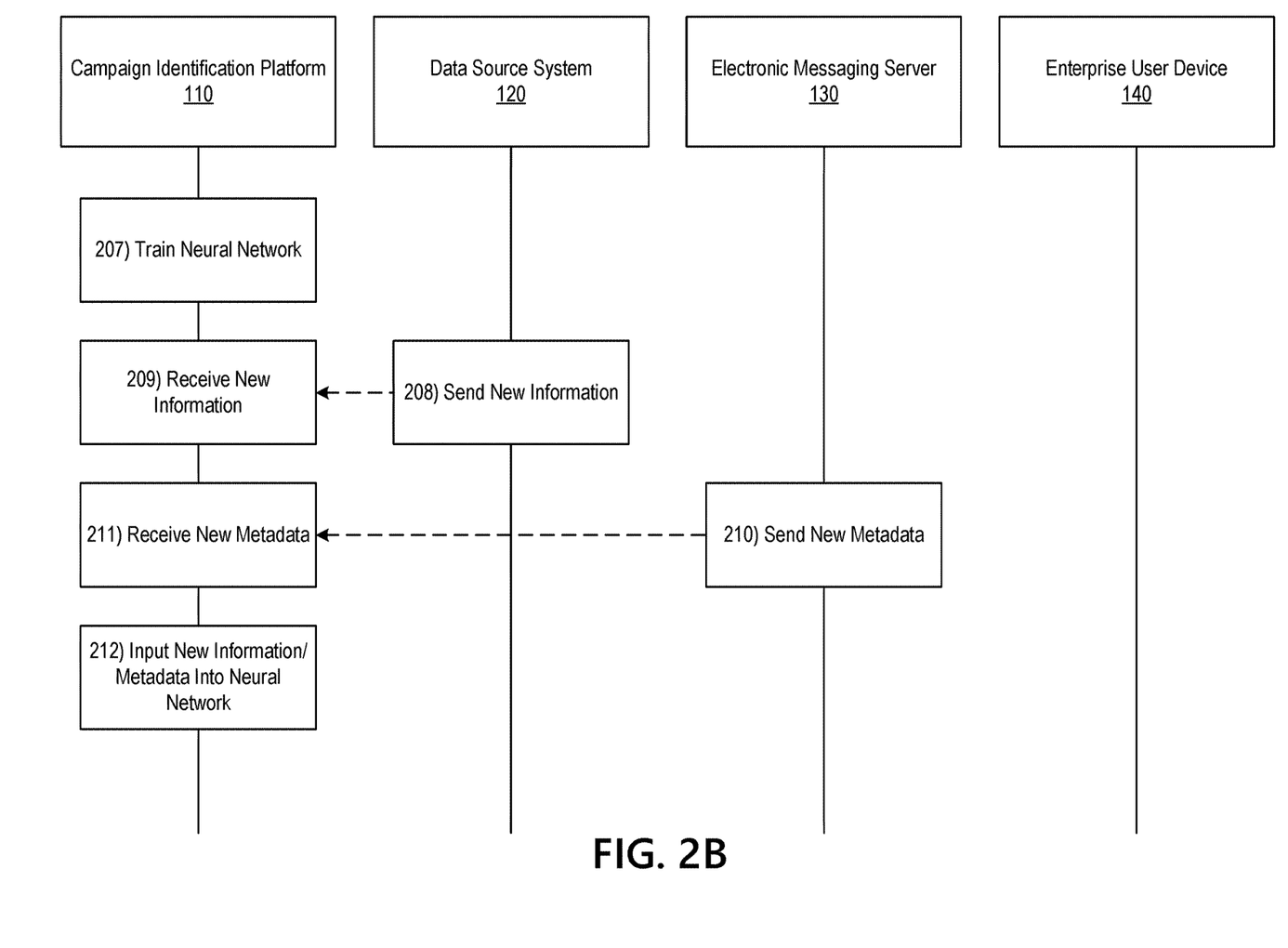

Referring to FIG. 2B, at step 207, the campaign identification platform 110 may train one or more neural networks to output indicators of compromise (e.g., indications of a threat) based on the aggregated features. For example, the campaign identification platform 110 may train the one or more neural networks to use metric learning. To do so, the campaign identification platform 110 may input two or more of the numerical representations into the one or more neural networks, and may prompt the one or more neural networks to produce certain embeddings (e.g., numerical representations) depending on the labels corresponding to the features that were input. In some instances, in training the one or more neural networks to use metric learning, the campaign identification platform 110 may train a Siamese network. In these instances, the campaign identification platform 110 may pass two inputs into the one or more neural networks. In some instances, the campaign identification platform 110 may prompt the one or more neural networks to produce similar numerical representations for each input if the two inputs have corresponding labels, and to produce different representations for each input if the two inputs have different labels.

Additionally or alternatively, the campaign identification platform 110 may train the one or more neural networks to learn and apply a vocabulary of sub words and/or pieces of words that are adapted to threat identification and clustering. For example, the campaign identification platform 110 may use sub-word embedding to train the one or more neural networks (e.g., when applying the one or more neural networks to text data) rather than applying the one or more neural networks to every letter individually and/or word separately. As an example, in using sub-word embedding to train the one or more neural networks, the campaign identification platform 110 may feed strings of characters that often fall together in training data (e.g., ".com") into the one or more neural networks as sub words.

By training the one or more neural networks to use both metric learning and sub-word embeddings to produce numerical representations, the campaign identification platform 110 may continuously adapt to—and thereby address—technical challenges presented by the constantly changing nature of the threat landscape. For example, features of different threats may be constantly changing (e.g., the filenames of files that threats may create, the URLs that threats may attempt to communicate with, and/or objects may change). Similarly, the labels that may be applied to different threats may be constantly changing (e.g., due to the temporal nature of campaigns). As a result of these challenges, conventional supervised machine learning (which may e.g., attempt to find an association between features and labels) might not work to address the technical problems addressed herein. One or more aspects of the disclosure, however, may provide various advantages over these conventional approaches, for instance, by providing the capability to continuously adapt to changing threats, as noted above.

At step 208, the data source system 120 may send new information to the campaign identification platform 110. In some instances, in sending the new information at step 208, the data source system 120 may send information similar to the information sent at step 201 (e.g., forensics and/or other information).

At step 209, the campaign identification platform 110 may receive the new information sent at step 208. For example, the campaign identification platform 110 may receive forensics data that may be input into the neural network trained at step 207.

At step 210, the electronic messaging server 130 may send new metadata to the campaign identification platform 110. For example, the electronic messaging server 130 may send new message metadata, similar to the message metadata sent at step 203, which may be input into the one or more neural networks trained at step 207.

At step 211, the campaign identification platform 110 may receive the new metadata sent at step 210. For example, the campaign identification platform 110 may receive new message metadata that may be input into the one or more neural networks.

At step 212, the campaign identification platform 110 may input the new information and/or new metadata into the one or more trained neural networks. In doing so, the campaign identification platform 110 may use the one or more neural networks to produce numerical representations for all threats corresponding to the new information and/or new metadata. For example, in producing the numerical representations, the campaign identification platform 110 may identify a smallest Euclidian distance between the new information and/or new metadata and data stored in the one or more neural networks (which may e.g., be used to define a proximity between the new information and/or new metadata and the data stored in the one or more neural networks).

Figure 2C:
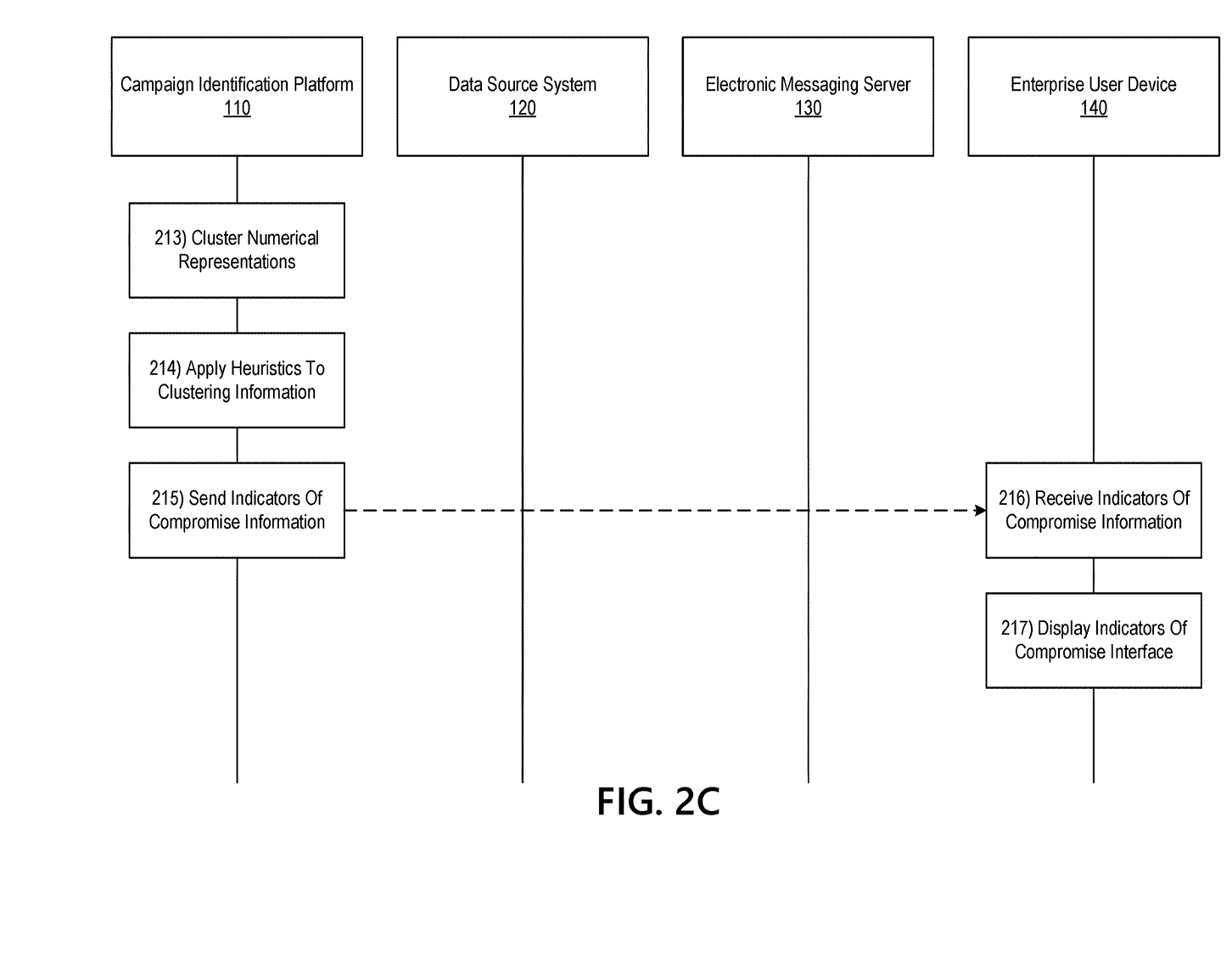

By converting this information and/or message metadata to numerical representations, the campaign identification platform 110 may output representations of the information and/or message metadata that may be clustered (e.g., as described further below at step 213). For example, clustering algorithms may be configured to process data input in the form of a numerical representation, and thus this conversion may enable the information to be processed by the clustering algorithms.

In some instances, in inputting this information and/or message metadata into the one or more neural networks, the campaign identification platform 110 may input unordered data of variable sizes. For example, the campaign identification platform 110 may input data corresponding to a first attachment that has five associated features and a second attachment that has three associated features. Typically, neural networks may be applied to fixed representations or sequences of data. One or more aspects of the disclosure provide a solution that overcomes this constraint, however, and these aspects enable successful analysis of unordered and variable data by neural networks. For example, such aspects of the disclosure enable processing of unordered data of variable size as opposed to merely data of a fixed sequence or representation.

Referring to FIG. 2C, at step 213, the campaign identification platform 110 may use a clustering algorithm to cluster the numerical representations output by the one or more neural networks. For example, the campaign identification platform 110 may cluster the numerical representations to produce clusters of forensics data and/or message metadata corresponding to groups of related threats and/or potential campaigns. Additionally or alternatively, the campaign identification platform 110 may cluster the numerical representations related to a particular attachment or URL together. In some instances, the campaign identification platform 110 may use a clustering algorithm such as connectivity based clustering, centroid based clustering, distribution based clustering, density based clustering, grid based clustering, and/or other clustering techniques.

By clustering the numerical representations in this way, the campaign identification platform 110 may reduce information identifying a number of threats to a much smaller number of threat clusters relative to the number of threats themselves. These threat clusters may then provide more manageable insights for further investigation of their corresponding threats (e.g., reduce thousands of threats to hundreds of threat clusters).

At step 214, the campaign identification platform 110 may apply heuristics to the clustering information produced at step 213. For example, the campaign identification platform 110 may evaluate a collection of features for all items in a particular cluster, and may identify possible features that may be indicators of compromise (e.g., that they correspond to a threat campaign). In some instances, in doing so, the campaign identification platform 110 may filter out certain features from the set of identified indicators of compromise. For example, the campaign identification platform 110 may identify that a particular feature is known to be a generic indicator of maliciousness, and may filter out this feature. Alternatively, the campaign identification platform 110 may identify a feature that is common within a particular cluster, but rare outside of the cluster. In these instances, the campaign identification platform 110 may identify that this feature is likely an indicator of compromise.

As a particular example, the campaign identification platform 110 may identify that, for a particular attachment based cluster, a URL is known to host malicious content. Additionally or alternatively, the campaign identification platform 110 may identify that a sender, IP address, organization, country, and/or combination thereof is known to be a source of malicious content. Identifying these indicators of compromise may be useful (e.g., to a threat research or other cybersecurity analyst) in further researching a threat corresponding to this particular cluster. As an additional example, the campaign identification platform 110 may identify information about messages used to deliver threats, and may cluster the information and/or message metadata accordingly (e.g., based on a sender, IP address, organization name, country, and/or other data).

At step 215, the campaign identification platform 110 may send indicators of compromise information to the enterprise user device 140 (e.g., based on the indicators of compromise identified at step 214). In some instances, the campaign identification platform 110 may also send one or more commands directing the enterprise user device 140 to display an indicators of compromise interface based on the indicators of compromise, which may cause the enterprise user device 140 to generate and/or display an indicators of compromise interface based on the indicators of compromise information.

At step 216, the enterprise user device 140 may receive the indicators of compromise information sent at step 215. In some instances, the enterprise user device 140 may also receive the one or more commands directing the enterprise user device 140 to generate and/or display the indicators of compromise interface based on the indicators of compromise information.

Figure 4:
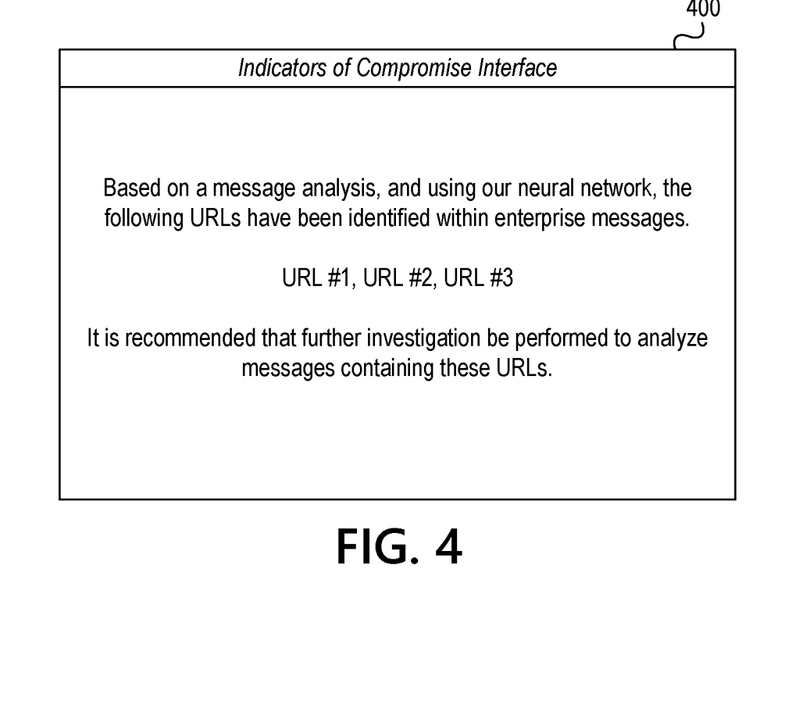
FIG. 4 depicts an illustrative user interface for using neural networks to process forensics and generate intelligence information in accordance with one or more example embodiments.

At step 217, based on or in response to the one or more commands directing the enterprise user device 140 to generate and/or display the indicators of compromise interface, the enterprise user device 140 may generate and/or display the indicators of compromise interface. For example, the enterprise user device 140 may generate and/or display a graphical user interface similar to graphical user interface 400, which is shown in FIG. 4. Specifically, the enterprise user device 140 may display a graphical user interface that indicates information about identified threat clusters, indicators of compromise, and/or any other data generated by the campaign identification platform 110. By displaying the indicators of compromise interface, the enterprise user device 140 may inform threat researchers of pieces of information that may be useful for identifying threats (e.g., URLs known to be hosting malicious things and/or other indicators of compromise).

Figure 2D:
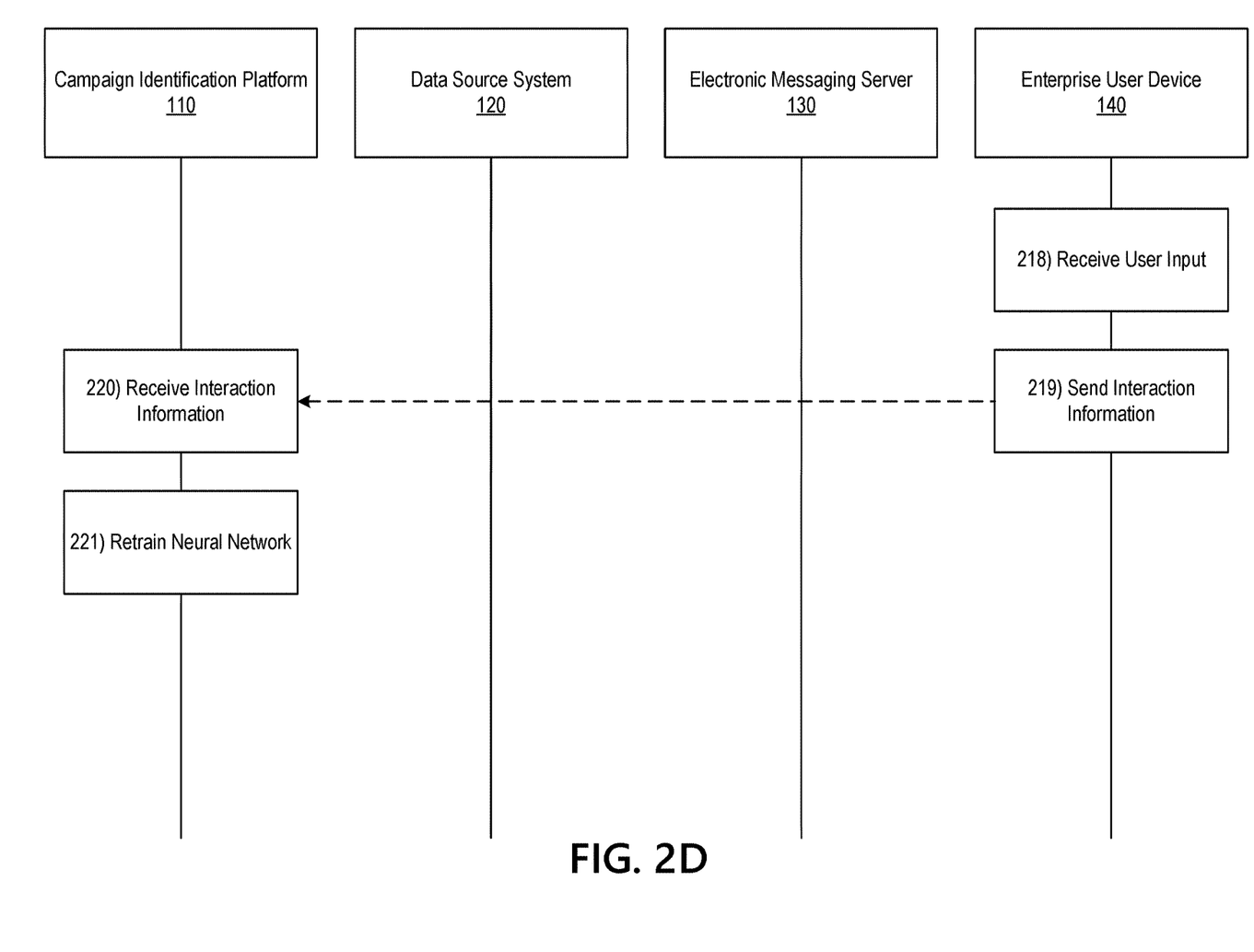

Referring to FIG. 2D, at step 218, the enterprise user device 140 may receive a user input. For example, a user (i.e., a cybersecurity analyst, information technology specialist, and/or other employee performing network security analysis), may interact with the indicators of compromise interface. In some instances, in receiving the user input, the enterprise user device 140 may receive input information indicating that a particular attachment and/or URL should be flagged for further analysis, identifying other attachments and/or URLs for further analysis, providing feedback (e.g., indicating whether or not an attachment and/or URL was correctly identified as compromised), indicating that information is incorrectly clustered, indicating that a particular indicator of compromise should be filtered out in the future (e.g., because it is a generic indicator of compromise) and/or other input information.

At step 219, the enterprise user device 140 may send user interaction information (e.g., based on the user input received at step 218) to the campaign identification platform 110. At step 220, the campaign identification platform 110 may receive the user interaction information sent at step 219.

At step 221, the campaign identification platform 110 may retrain the one or more neural networks based on the user interaction information received at step 220. For example, the campaign identification platform 110 may relabel clustered information and/or message metadata in the one or more neural networks based on feedback and/or other information received at step 220.

The steps described in the illustrative event sequence herein may be performed in any alternative sequence or order without departing from the scope of the disclosure. Furthermore, although the above described systems, event sequence, and methods are described primarily in the context of cybersecurity training, this is solely for illustrative purposes, and the systems, event sequence, and methods described herein may be applied in other contexts without departing from the scope of the disclosure.

Figure 3:
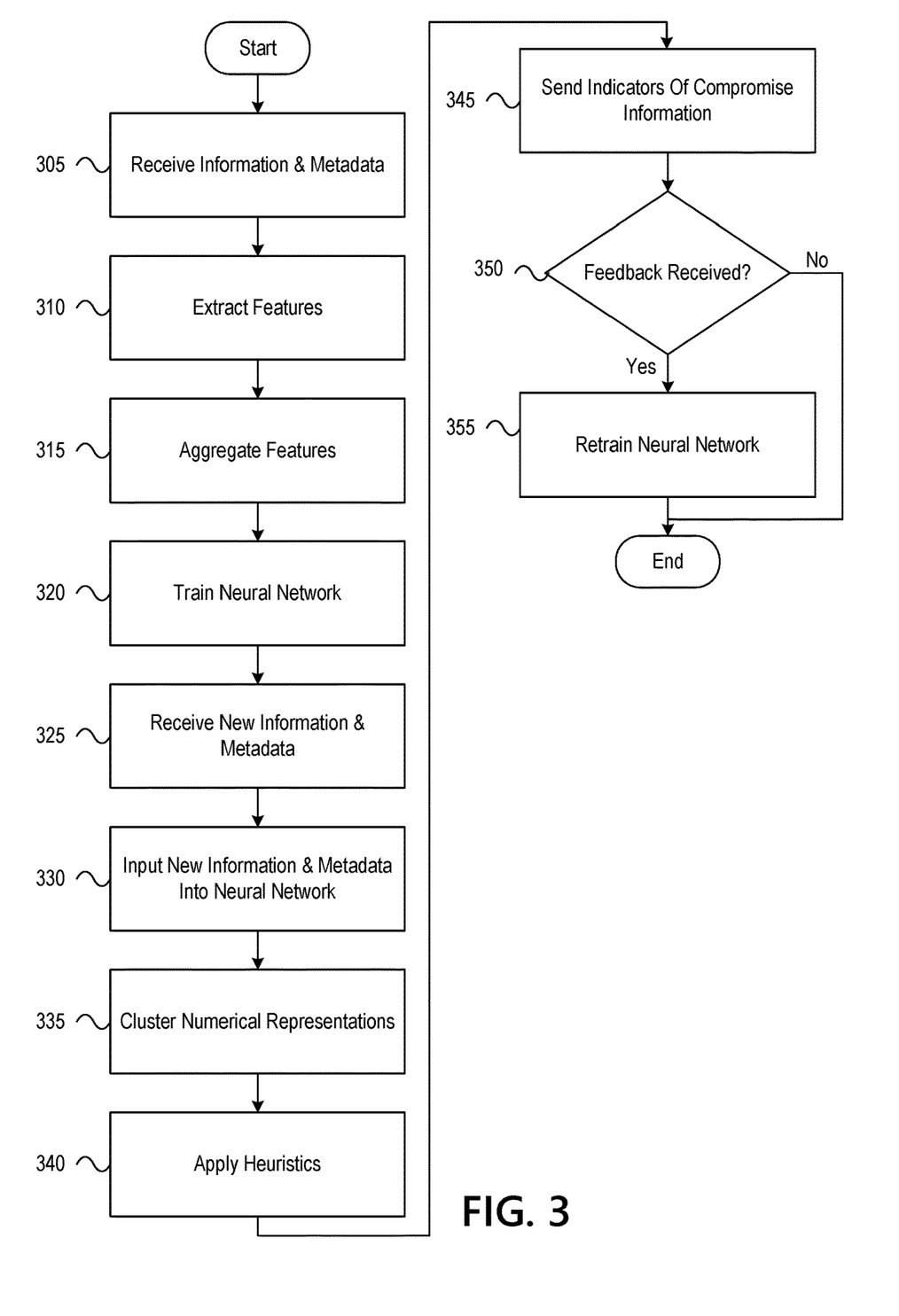
FIG. 3 depicts an illustrative method for using neural networks to process forensics and generate intelligence information in accordance with one or more example embodiments.

FIG. 3 depicts an illustrative method for using neural networks to process forensics and generate intelligence information in accordance with one or more example embodiments. Referring to FIG. 3, at step 305, a computing platform having at least one processor, a communication interface, and memory may receive information and/or message metadata that may be used to train one or more neural networks for threat identification. At step 310, the computing platform may extract one or more features from the information and/or message metadata. At step 315, the computing platform may aggregate the features by threat. At step 320, the computing platform may train the one or more neural networks to identify indicators of compromise using the information and/or message metadata. At step 325, the computing platform may receive new information and/or message metadata. At step 330, the computing platform may input the new information and/or message metadata into the one or more neural networks, which may result in numerical representations of the new information and/or message metadata. At step 335, the computing platform may cluster the numerical representations generated at 330. At step 340, the computing platform may apply heuristics to the clusters to identify indicators of compromise. At step 345, the computing platform may send indicators of compromise information to an enterprise user device. At step 350, the computing platform may identify whether any feedback was received in response to the indicators of compromise information. If feedback was not received, the method may end. If feedback was received, the computing platform may proceed to step 355. At step 355, the computing platform may retrain and/or otherwise update the neural network based on the feedback.

It should be understood that the analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
train a neural network, wherein training the neural network comprises training the neural network using metric learning and sub-word embeddings, and wherein training the neural network using the metric learning comprises:
inputting two or more inputs into the neural network;
identifying labels corresponding to each of the two or more inputs; and
prompting the neural network to produce particular embeddings based on the identified labels;
receive forensics information corresponding to a plurality of message attachments;
generate, for each of the plurality of message attachments, a feature representation;
input the feature representations into the neural network, wherein inputting the feature representations into the neural network results in a numeric representation for each of the plurality of message attachments;
apply a clustering algorithm to cluster each of the plurality of message attachments based on the numeric representations, resulting in clustering information;
extract, from the clustering information, one or more indicators of compromise indicating that one or more of the plurality of attachments corresponds to a threat campaign; and
send, to an enterprise user device, user interface information comprising the one or more indicators of compromise, wherein sending the user interface information causes the enterprise user device to display a user interface identifying the one or more indicators of compromise.

2. The computing platform of claim 1, wherein the neural network is a Siamese network.

3. The computing platform of claim 2, wherein:
the neural network is trained to produce a common embedding if the two or more inputs have corresponding labels,
the neural network is trained to produce different embeddings if the two of more inputs have different labels.

4. The computing platform of claim 1, wherein using the sub-word embeddings comprises training the neural network to learn a vocabulary of sub-words adapted to threat identification.

5. The computing platform of claim 1, wherein the one or more indicators of compromise each correspond to a particular threat campaign.

6. The computing platform of claim 1, wherein the one or more indicators of compromise indicate one or more of: a uniform resource locator (URL) known to host malicious content, a sender name, an internet protocol (IP) address, an organization name, or a country.

7. The computing platform of claim 1, wherein extracting the one or more indicators of compromise comprises:
identifying one or more generic indicators of compromise; and
filtering, from the one or more indicators of compromise, the one of more generic indicators of compromise.

8. A method comprising:
at a computing platform comprising at least one processor, a communication interface, and memory:
training, by the at least one processor, a neural network, wherein training the neural network comprises training the neural network using metric learning and sub-word embeddings, and wherein training the neural network using the metric learning comprises:
inputting two or more inputs into the neural network;
identifying labels corresponding to each of the two or more inputs; and
prompting the neural network to produce particular embeddings based on the identified labels;
receiving, by the at least one processor, forensics information corresponding to a plurality of message attachments;
generating, by the at least one processor and for each of the plurality of message attachments, a feature representation;
inputting, by the at least one processor, the feature representations into the neural network, wherein inputting the feature representations into the neural network results in a numeric representation for each of the plurality of message attachments;
applying, by the at least one processor, a clustering algorithm to cluster each of the plurality of message attachments based on the numeric representations, resulting in clustering information;
extracting, by the at least one processor and from the clustering information, one or more indicators of compromise indicating that one or more of the plurality of attachments corresponds to a threat campaign; and
sending, by the at least one processor and to an enterprise user device, user interface information comprising the one or more indicators of compromise, wherein sending the user interface information causes the enterprise user device to display a user interface identifying the one or more indicators of compromise.

9. The method of claim 8, wherein the neural network is a Siamese network.

10. The method of claim 8, wherein:
the neural network is trained to produce a common embedding if the two or more inputs have corresponding labels,
the neural network is trained to produce different embeddings if the two of more inputs have different labels.

11. The method of claim 8, wherein using the sub-word embeddings comprises training, by the at least one processor, the neural network to learn a vocabulary of sub-words adapted to threat identification.

12. The method of claim 8, wherein the one or more indicators of compromise each correspond to a particular threat campaign.

13. The method of claim 8, wherein the one or more indicators of compromise indicate one or more of: a uniform resource locator (URL) known to host malicious content, a sender name, an internet protocol (IP) address, an organization name, or a country.

14. The method of claim 8, wherein extracting the one or more indicators of compromise comprises:
identifying, by the at least one processor, one or more generic indicators of compromise; and
filtering, by the at least one processor and from the one or more indicators of compromise, the one of more generic indicators of compromise.

15. One or more non-transitory computer-readable media storing instructions that, when executed by a computing platform comprising at least one processor, a communication interface, and memory, cause the computing platform to:
- train a neural network, wherein training the neural network comprises training the neural network using metric learning and sub-word embeddings, and wherein training the neural network using the metric learning comprises:
  - inputting two or more inputs into the neural network;
  - identifying labels corresponding to each of the two or more inputs; and
  - prompting the neural network to produce particular embeddings based on the identified labels;
- receive forensics information corresponding to a plurality of message attachments;
- generate, for each of the plurality of message attachments, a feature representation;
- input the feature representations into the neural network, wherein inputting the feature representations into the neural network results in a numeric representation for each of the plurality of message attachments;
- apply a clustering algorithm to cluster each of the plurality of message attachments based on the numeric representations, resulting in clustering information;
- extract, from the clustering information, one or more indicators of compromise indicating that one or more of the plurality of attachments corresponds to a threat campaign; and
- send, to an enterprise user device, user interface information comprising the one or more indicators of compromise, wherein sending the user interface information causes the enterprise user device to display a user interface identifying the one or more indicators of compromise.

* * * * *